United States Patent [19]
Nadolink

[11] Patent Number: 5,814,816
[45] Date of Patent: Sep. 29, 1998

[54] SYSTEM FOR MONITORING SURFACE STRESS AND OTHER CONDITIONS IN STRUCTURES

[75] Inventor: Richard H. Nadolink, Portsmouth, R.I.

[73] Assignee: The United States of America as represented by the Secretary of the Navy, Washington, D.C.

[21] Appl. No.: 716,665

[22] Filed: Aug. 27, 1996

[51] Int. Cl.[6] .................................................. G01L 1/24
[52] U.S. Cl. .................. 250/341.1; 250/340; 250/341.1; 250/341.8; 358/35.5
[58] Field of Search ............................ 250/341.4, 341.1, 250/340, 341.8; 356/35.5

[56] References Cited

U.S. PATENT DOCUMENTS 5,693,889  12/1997  Nadolink .................................. 73/800

OTHER PUBLICATIONS

M. Jarosz, L. Kocsányi, and J. Giber, "In situ deformation measurement on the surface of silicon wafers." *J. Phys. E: Sci. Instrum.*, vol. 15, No. 7, pp. 746–748 Copyright 1982 The Institute of Physics, Jul. 1982.

*Primary Examiner*—Constantine Hannaher
*Attorney, Agent, or Firm*—Michael J. McGowan; Michael F. Oglo; Prithvi C. Lall

[57] ABSTRACT

A system for monitoring a structure is built on a printed circuit board (PCB) mounted at the surface of the structure. A piece of single crystal silicon is mounted on the PCB and is in contact with the structure. An infrared source directly illuminates the silicon while an infrared detector is focused thereon to monitor isochromatic fringe patterns projected from the silicon as a direct indication of stress at the surface. One or more other sensors are coupled to the PCB for collecting data indicative of other physical conditions experienced by the structure. A wireless system communicates with each such sensor so that the data so collected can be received at a remote location.

18 Claims, 1 Drawing Sheet

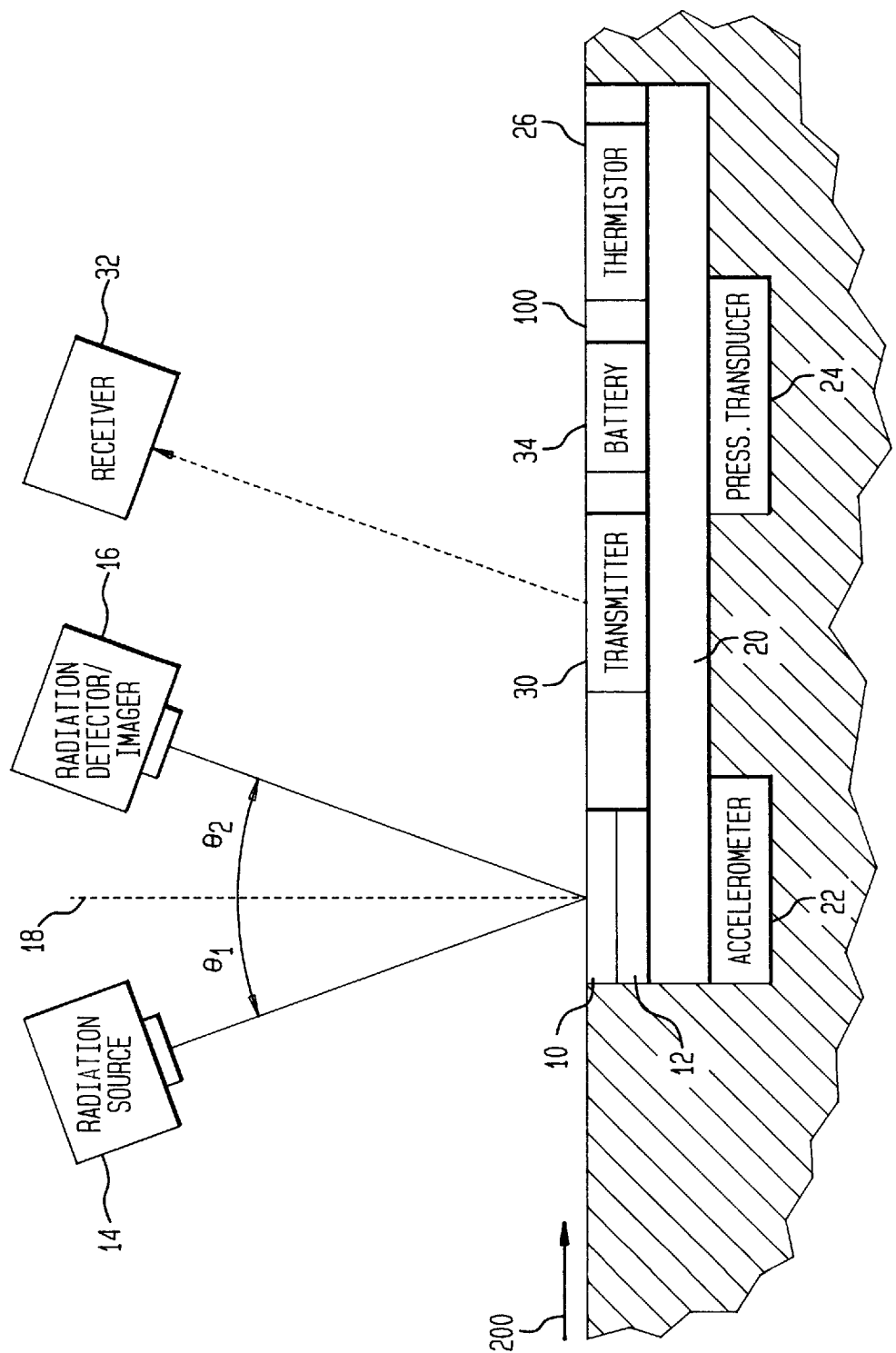

SYSTEM FOR MONITORING SURFACE STRESS AND OTHER CONDITIONS IN STRUCTURES

STATEMENT OF GOVERNMENT INTEREST

The invention described herein may be manufactured and used by or for the Government of the United States of America for Governmental purposes without the payment of any royalties thereon or therefor.

CROSS-REFERENCE TO RELATED PATENT APPLICATIONS

This patent application is co-pending with two related patent applications entitled "Photoelastic Stress Sensor", Ser. No. 08/605,291, filed Jan. 17, 1996, and "Method of Monitoring Surface Stress" (Navy Case No. 77285), application Ser. No. 08/716,664, now U.S. Pat. No. 5,693,889, filed the same date and by the same inventor as this patent application.

BACKGROUND OF THE INVENTION

(1). Field of the Invention

The present invention relates generally to systems for monitoring physical conditions of structures, and more particularly to a system that remotely monitors stress at a structure's surface as well as one or more other conditions experienced by the structure such as shock waves and pressure waves.

(2). Description of the Prior Art

Inspection of structures is required periodically to determine the structural integrity thereof. However, such inspections are generally visual inspections requiring an extensive amount of expertise and time to accomplish. These visual inspections are further made difficult when the structure is partially or completely submerged in a moving fluid, e.g., the submerged portion of a bridge, an underwater vehicle, an airborne vehicle that is to be evaluated in flight, etc. Further, the structure can appear to be sound when in fact the structure is under, or has experienced, a dangerous amount of stress. Thus, a proper inspection requires evaluation of a variety of physical conditions such as stress experienced by the structure or changes in stress over time, continuous or peak shock experienced by the structure, continuous or peak pressure waves experienced by the structure, etc.

SUMMARY OF THE INVENTION

Accordingly, it is an object of the present invention to provide a system which simultaneously performs monitoring of stress and monitoring of at least one other of a variety of physical conditions of a structure.

Another object of the present invention is to provide a system that can be used to remotely and simultaneously monitor stress and at least one of a variety of other physical conditions of the structure experiencing a fluid flow thereover without interrupting such fluid flow.

Other objects and advantages of the present invention will become more obvious hereinafter in the specification and drawings.

In accordance with the present invention, a system for monitoring a structure is built on a printed circuit board (PCB) mounted at the surface of the structure. A piece of single crystal silicon in contact with the structure is mounted on the PCB. An infrared source directly illuminates the single crystal silicon with radiation having a wavelength in the range of 800–1100 nanometers. An infrared detector is focused on the single crystal silicon to monitor isochromatic fringe patterns projected from the silicon as a result of illuminating same with the radiation. The isochromatic fringe patterns are a direct indication of the amount of stress at the surface of the structure. One or more sensors are coupled to the PCB for collecting data indicative of a physical condition experienced by the structure. Monitoring means in the form of a wireless or hard-wired system communicate with each sensor for receiving the data so collected.

BRIEF DESCRIPTION OF THE DRAWINGS

Other objects, features and advantages of the present invention will become apparent upon reference to the following description of the preferred embodiments and to the drawings, wherein:

The sole FIGURE is a schematic view of an apparatus configured for monitoring a structure in accordance with the present invention.

DESCRIPTION OF THE PREFERRED EMBODIMENTS

Referring now to the sole FIGURE, the present invention will be described for the application of monitoring a variety of physical conditions experienced by a structure. The structure can be in an air environment, a fluid flow environment, or a combination thereof. However, the present invention will be explained relative to a portion of a structure that is maintained in a fluid flow in order to illustrate the versatility of the present invention.

A portion of the structure to be examined is shown in cross-section and is referenced by numeral 100. The fluid flow over structure 100 is referenced by flow arrow 200. It is to be appreciated that the organization in which structure 100 is situated may take various forms. These include being fixedly mounted in water and wind tunnels, undergoing movement as part of a body being impelled through a hydrodynamic towing basin, and being part of a static structure residing in a fluid medium whose movement is not being controlled for test purposes such buildings, bridges, underwater piping, and components of mechanisms in operational ducting. Flow arrow 200 is representative of any liquid (e.g., water) or gaseous (e.g., air, steam) flow.

With respect to monitoring stress in structure 100, a small piece or wafer 10 of semiconductor grade, single crystal silicon is embedded in structure 100. Wafer 10 is in contact with structure 100 and, typically, is made flush with the surface of structure 100 so that it is not directly affected by flow 200 and so that wafer 10 does not disturb flow 200. Wafer 10 is preferably, but not necessarily, backed by a mirror 12 or other reflective surface. A radiation source 14 and radiation detector/imager 16 are positioned remotely from surface 100. The radiation source 14 referred to is a conventional, commercially available product for use as a component in various electro-optical systems. More specifically, in accordance with the present invention, a source 14 is employed which is capable of illuminating wafer 10 with near-infrared radiation in the 800–1100 nanometer wavelength range. The radiation detector/imager 16 referred to is also a conventional, commercially available product capable of focusing in the context of the distance between detector/imager 16 and surface 100. A variety of such source and detector/imager devices are listed in the product catalogue of Edmund Scientific Company, Barrington, N.J.

Illumination by source 14 and monitoring by detector/imager 16 typically occurs in a plane that is normal to wafer 10. As shown, illumination from source 14 can occur along angle $\theta_1$, with respect to dashed line 18 representative of a line normal to wafer 10. Monitoring of wafer 10 would be accomplished by focusing detector/imager 16 from a position on the same or opposite side of line 18 along angle $\theta_2$ where $\theta_1$ and $\theta_2$ can be acute angles equivalent or different in magnitude. Alternatively, both the illumination of wafer 10 and monitoring (i.e., observation and/or imaging) of the resulting effects can occur directly above wafer 10 along line 18.

The monitoring of stress of the structure 100 in accordance with the above-described elements of the present invention depends upon the birefringent phenomenon. Many materials are optically sensitive to stress and strain, i.e., they possess the optical properties of polarizing light when under stress and of transmitting light or the principal stress planes with velocities dependent on the stresses. Transmission of stress planes is known as birefringence or double refraction. When wafer 10 is subjected to the specified radiation from source 14, the birefringent effect causes the light to emerge refracted into two orthonormal planes. Because the velocities of light propagation are different in each direction, the light waves experience a phase shift. When the light waves are recombined at detector/imager 16, regions of stress where the wave phases cancel appear black, and regions of stress where the wave phases combine appear light. Therefore, in photoelastic surfaces where complex, fast changing or 3-D stress distributions are present, light and dark fringe patterns (isochromatic fringes) are projected from wafer 10. The fringe patterns are direct manifestations of stress which can be observed and/or imaged by detector/imager 16. The use of mirror 12 aids in the direct monitoring of the fringe patterns from positions normal to wafer 10 or positions angularly displaced from normal line 18 as shown in the FIGURE. A quantitative measure of surface stress can thus be achieved by calibrating images of the fringe patterns with their respective known levels of stress.

In order to stimulate the above described photoelastic effect, it is necessary to make wafer 10 transparent. The crystal structure of semiconductor grade, single crystal silicon can be made optically transparent by radiation having a wavelength between 800–1100 nanometers.

In addition to monitoring stress in structure 100, the present invention monitors a plurality of additional physical conditions experienced by structure 100 in a simple fashion. Referring again to the FIGURE, a printed circuit board (PCB) 20 is shown embedded in structure 100 beneath wafer 10 (and mirror 12 if present). Typically, PCB 20 would serve as a mounting and support surface for wafer 10 (and mirror 20). PCB 20 is any conventional printed circuit board having electrical wiring and connections "printed" thereon or therein as is well known in the art.

Mounted on PCB 20 are a plurality of physical condition detecting sensors such as accelerometer 22, pressure transducer 24 and thermistor 26. Placement of the sensors on PCB 20 can be varied as long as each sensor is in contact with the environment of interest. For example, in the embodiment shown, accelerometer 22 and transducer 24 are in contact with structure 100 for measuring shocks and pressure, respectively, experienced by structure 100. Thermistor 26 is shown in contact with flow 200 for measuring the temperature thereof which can be important to the integrity of structure 100 if the fluid flow is changing state, e.g., water to steam, water to ice, etc.

Data collected by each of the sensors can be coupled via PCB conductor strips (not shown) of PCB 20 to a transmitter 30. Transmitter 30 broadcasts the data to a remotely located receiver 32. Transmitter 30 may be of the type which communicates employing the mode of modulation of an infrared beam directed at receiver 32. The data can be collected on a continuous basis or a periodic basis if power consumption is a concern. Another alternative is to just transmit data each time a preset threshold or peak value of one of the physical conditions is experienced. The wireless, remote form of data communication is particularly useful when it is desirable or necessary not to disturb flow 200. However, it is to be understood that conventional hard-wire communication (i.e., likely in the form of PCB conductor strips) with each of the sensors on PCB 20 could also be used. Power for the components on PCB 20 could be supplied by battery 34 which in many instances can be a solar powered battery.

The advantages of the present invention are numerous. With respect to the stress monitoring aspect of the present invention, the semiconductor grade, single crystal silicon provides for direct measurement of stress with no moving parts. The single crystal silicon is a material that is highly corrosion resistant. In addition, the single crystal silicon can be activated and read from positions that are remote from the structure in question over a variety of angles of illumination and observation. The single crystal silicon is easily conformed in size and shape to the surface of a structure. Furthermore, the inclusion of a PCB with a variety of other physical condition sensors greatly improves the knowledge base concerning a structure's condition. The remote interrogation of these sensors allows the system of the present invention to be used in a wide variety of moving and static structure applications. The simplicity of the present invention results in an inexpensive approach to monitoring and measuring surface stress and other physical conditions of a structure that can be, but need not be, in the presence of a fluid flow.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for monitoring a structure, comprising:
   a printed circuit board mounted at the surface of the structure;
   a piece of single crystal silicon mounted on said printed circuit board, said piece of single crystal silicon being in contact with the structure;
   an infrared source for directly illuminating said piece of single crystal silicon with radiation having a wavelength in the range of 800–1100 nanometers;
   an infrared detector focused on said piece of single crystal silicon for monitoring isochromatic fringe patterns projected from said piece of single crystal silicon as a result of illuminating said piece of single crystal silicon with said radiation, wherein said isochromatic fringe patterns are a direct indication of an amount of stress at the surface of the structure;
   at least one sensor coupled to said printed circuit board, each said at least one sensor being capable of collecting data indicative of a physical condition experienced by the structure; and monitoring means in communication with each said at least one sensor for receiving said data.

2. A system as in claim 1 further comprising a mirror mounted between said piece of single crystal silicon and said printed circuit board.

3. A system as in claim 1 wherein said piece of single crystal silicon is flush with a surface of the structure.

4. A system as in claim 1 wherein said infrared source illuminates said piece of single crystal silicon from a first angle with respect to a line normal to said piece of single crystal silicon.

5. A system as in claim 4 wherein said infrared detector is focused on said piece of single crystal silicon from a second angle with respect to said line, said first angle and said second angle being equal in magnitude.

6. A system as in claim 5 wherein said infrared source and said infrared detector lie on opposing sides of said line in a plane normal to said piece of single crystal silicon.

7. A system as in claim 1 wherein said monitoring means comprises:

a transmitter mounted on said printed circuit board and in communication with each said at least one sensor, said transmitter transmitting said data; and a receiver remotely located with respect to the structure for receiving said data from said transmitter.

8. A system as in claim 7 wherein said transmitter is of the type which communicates employing a modulated infrared beam.

9. A system as in claim 1 further comprising a power supply mounted on said printed circuit board and coupled to each said at least one sensor for supplying power thereto.

10. A system as in claim 9 wherein said power supply is solar powered.

11. A system for monitoring a structure exposed to a fluid flow, comprising:

a printed circuit board embedded in the structure;

a mirror-backed single crystal silicon semiconductor wafer mounted on said printed circuit board such that said wafer is in contact with the structure and flush with the surface of the structure;

an infrared source for directly illuminating said wafer through the fluid flow with radiation having a wavelength in the range of 800–1100 nanometers;

an infrared detector focused through the fluid flow on said wafer for monitoring isochromatic fringe patterns projected from said wafer as a result of illuminating said wafer with said radiation, wherein said isochromatic fringe patterns are a direct indication of an amount of stress at the surface of the structure;

at least one sensor coupled to said printed circuit board, each said at least one sensor being capable of collecting data indicative of a physical condition experienced by the structure; and monitoring means in communication with each said at least one sensor for receiving said data.

12. A system as in claim 11 wherein said infrared source illuminates said wafer from a first angle with respect to a line normal to said wafer.

13. A system as in claim 12 wherein said infrared detector is focused on said wafer from a second angle with respect to said line, said first angle and said second angle being equal in magnitude.

14. A system as in claim 13 wherein said infrared source and said infrared detector lie on opposing sides of said line in a plane normal to said wafer.

15. A system as in claim 11 wherein said monitoring means comprises:

a transmitter mounted on said printed circuit board and in communication with each said at least one sensor, said transmitter transmitting said data through the fluid flow; and a receiver remotely located with respect to the structure for receiving said data from said transmitter.

16. A system as in claim 15 wherein said transmitter is of the type which communicates employing a modulated infrared beam.

17. A system as in claim 11 further comprising a power supply mounted on said printed circuit board and coupled to each said at least one sensor for supplying power thereto.

18. A system as in claim 17 wherein said power supply is solar powered.

* * * * *